(12) United States Patent
Munshi et al.

(10) Patent No.: US 7,302,918 B2
(45) Date of Patent: Dec. 4, 2007

(54) METHOD AND APPARATUS FOR PROVIDING FOR HIGH EGR GASEOUS-FUELLED DIRECT INJECTION INTERNAL COMBUSTION ENGINE

(75) Inventors: Sandeep Munshi, Vancouver (CA); Gordon P. McTaggart-Cowan, Vancouver (CA); W. Kendal Bushe, Vancouver (CA); Steven N. Rogak, Vancouver (CA)

(73) Assignees: Westport Power Inc., Vancouver, B.C. (CA); University of British Columbia, Vancouver, B.C. (CA)

( * ) Notice: Subject to any disclaimer, the term of this patent is extended or adjusted under 35 U.S.C. 154(b) by 0 days.

(21) Appl. No.: 11/277,714

(22) Filed: Mar. 28, 2006

(65) Prior Publication Data

US 2006/0260585 A1   Nov. 23, 2006

Related U.S. Application Data

(63) Continuation of application No. PCT/CA2004/001736, filed on Sep. 23, 2004.

(51) Int. Cl.
*F02B 1/14* (2006.01)
*F02B 7/00* (2006.01)
*F02M 25/06* (2006.01)

(52) U.S. Cl. .................. 123/27 GE; 123/299; 123/304; 123/525; 123/568.21

(58) Field of Classification Search ........... 123/27 GE, 123/299, 300, 304, 525, 526, 568.21
See application file for complete search history.

(56) References Cited

U.S. PATENT DOCUMENTS

| | | | |
|---|---|---|---|
| 3,703,886 A | 11/1972 | Witzky | |
| 3,915,134 A | 10/1975 | Young et al. | |
| 5,520,161 A | 5/1996 | Klopp | |
| 5,553,575 A | 9/1996 | Beck et al. | |
| 6,138,649 A | 10/2000 | Khair et al. | |
| 6,286,482 B1 | 9/2001 | Flynn et al. | |
| 6,367,443 B1 | 4/2002 | Bassi et al. | |
| 6,405,720 B1 | 6/2002 | Collier, Jr. | |
| 6,912,992 B2 * | 7/2005 | Ancimer et al. ............ 123/299 |

FOREIGN PATENT DOCUMENTS

| | | |
|---|---|---|
| EP | 0320959 A2 | 6/1989 |
| EP | 1234966 A2 | 8/2002 |
| JP | 62-271940 | 11/1987 |
| JP | 01-155051 | 6/1989 |
| JP | 2002-155783 | 5/2002 |

(Continued)

*Primary Examiner*—T. M. Argenbright
(74) *Attorney, Agent, or Firm*—McAndrews Held & Malloy, Ltd.

(57) ABSTRACT

A method and apparatus adjust pilot fuel injection timing in relation to a main fuel injection timing into a piston cylinder of an operating gaseous-fuelled direct injection internal combustion engine using high levels of EGR. A set of engine parameters are monitored which determine engine load and engine speed and an indicator of EGR concentration within the intake charge. Pilot fuel timing relative to main fuel injection timing is then adjusted according to the engine parameters. High levels of EGR are shown to be tolerated with relatively limited penalties in relation to other emissions typically found with high EGR by reducing the relative injection timing the pilot fuel as compared to main fuel injection timing.

14 Claims, 4 Drawing Sheets

FOREIGN PATENT DOCUMENTS

| | | |
|---|---|---|
| JP | 2002-206441 | 7/2002 |
| JP | 2002-221037 | 8/2002 |
| JP | 2003-222048 | 8/2003 |
| WO | WO 97/04229 | 2/1997 |
| WO | WO 01/59285 | 8/2001 |

* cited by examiner

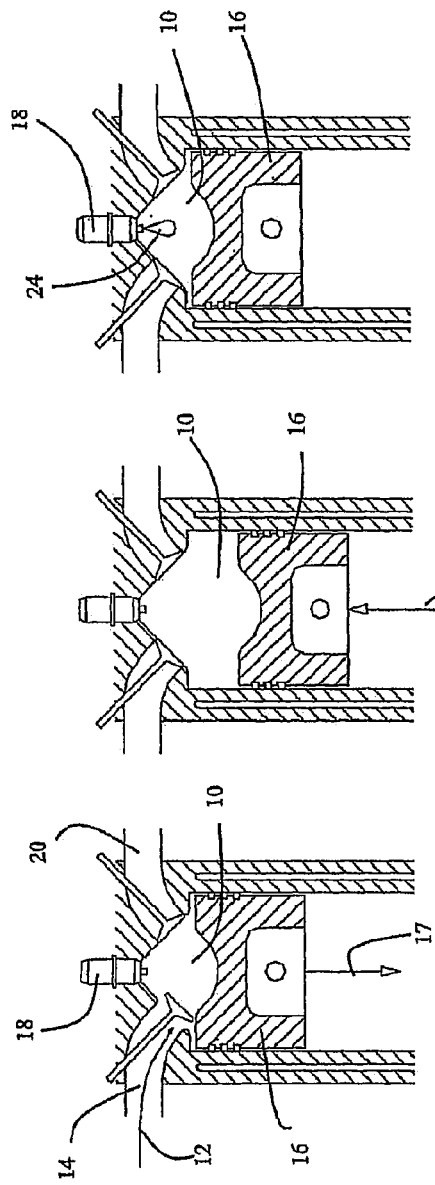
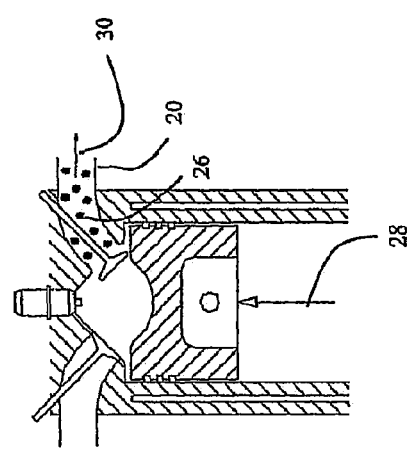
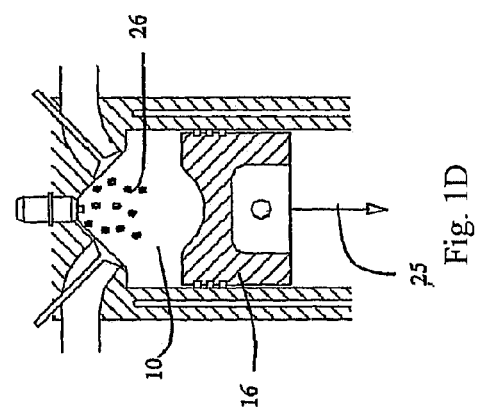
Fig. 1A
Fig. 1B
Fig. 1C
Fig. 1D
Fig. 1E

METHOD AND APPARATUS FOR PROVIDING FOR HIGH EGR GASEOUS-FUELLED DIRECT INJECTION INTERNAL COMBUSTION ENGINE

CROSS-REFERENCE TO RELATED APPLICATION(S)

This application is a continuation of International Application No. PCT/CA2004/001736, having an international filing date of Sep. 23, 2004, entitled "Method And Apparatus For Providing For High EGR Gaseous-Fuelled Direct Injection Internal Combustion Engine". International Application No. PCT/CA2004/001736 claimed priority benefits, in turn, from Canadian Patent Application No. 2,442,336 filed Sep. 30, 2003. International Application No. PCT/CA2004/001736 is hereby incorporated by reference herein in its entirety.

FIELD OF THE INVENTION

This invention relates to a method and apparatus for controlling emissions and engine performance to provide for high levels of exhaust gas recirculation (EGR; the recirculated exhaust stream is also referred to herein as EGR) in a gaseous-fuelled direct injection engine.

BACKGROUND OF THE INVENTION

For all their advantages, diesel-fuelled engines have a significant disadvantage. When burned substantially in a diffusion combustion mode, diesel fuel generates high levels of some pollutants. Pollutants such as oxides of nitrogen (NOx) and particulate matter (PM) can be problematic. Cleaner burning gaseous fuels such as natural gas, hydrogen, ethane, propane, blends of gaseous fuels such as blends of natural gas and hydrogen, as well as others tend to expel fewer pollutants than diesel fuel when burned in an internal combustion engine. It has been determined that some gaseous fuels can also provide similar power output when directly injected at high pressure upon completion of a compression stroke or near the commencement of a power stroke in, for example, a four-stroke engine.

While providing emissions benefits, gaseous fuels tend to need some type of ignition assist to initiate combustion when used in an engine with diesel engine compression ratios. One common ignition assist is a pilot fuel provided to a charge to create an auto-ignitable charge that can be used to help initiate combustion of the gaseous fuel when the gaseous fuel is directly injected, as noted above.

Ultimately, however, while providing emissions benefits, combustion of gaseous fuels do generate NOx. In particular, diffusion combustion resulting from gaseous-fuelled direct injection engines tends to generate higher NOx levels than is the case with combustion of a premixed gaseous charge. However, techniques are available for lowering NOx in such an engine. It has been found that exhaust gas recirculation (EGR) can be an important method for reducing NOx in a compression ignition direct injection engine.

Ideally, ever increasing concentrations of EGR in the intake charge would be used in gaseous-fuelled direct injection engines. That is, more EGR tends to reduce NOx. However, as EGR concentrations increase, emissions penalties in relation to other emissions occur. In particular, hydrocarbons (HC), carbon monoxide (CO) and particulate matter (PM) all start to increase with ever increasing levels of EGR. Therefore, EGR for compression ignition direct injection engines have tended to be limited to 30% before other emission become prohibitive.

The present method is applicable to gaseous fuelled compression ignition direct injection engines (or direct injection engines that use a main fuel requiring a auto-ignitable pilot fuel to assist in ignition of the main fuel) for reducing overall emissions by using high EGR levels (beyond 30% by mass concentration in the intake charge) while managing other emissions that frequently arise with high levels of EGR.

SUMMARY OF THE INVENTION

The present method and apparatus secure high EGR rates while managing emissions that tend to result from such high EGR levels. The emissions at high EGR levels are adjusted by controlling the timing of the pilot fuel injection of the gaseous-fuelled direct injection engine based on the EGR concentration.

Accordingly, in one aspect, a method of operating a gaseous-fuelled direct injection internal combustion engine comprises determining an engine speed and engine load for the engine for a cycle of the engine. During the cycle of the engine an intake charge is directed into the combustion chamber, the intake charge having an exhaust gas recirculation (EGR) concentration. The intake charge is compressed within the combustion chamber during a compression stroke of the engine. A gaseous fuel is directly injected into the combustion chamber at a main fuel timing and a quantity of a pilot fuel is directly injecting into the combustion chamber at a pilot fuel timing relative to the main fuel timing selected by reference to an indicator of the EGR concentration, the engine speed and the engine load. The pilot fuel is capable of auto-igniting at a first injection crank angle when a piston is near or at top dead center within the combustion chamber. The gaseous fuel and the pilot fuel are burned within the combustion chamber where the gaseous fuel is ignited as a result of combustion of the pilot fuel.

In a further embodiment, the indicator noted above comprises an oxygen concentration in the intake charge or a carbon dioxide concentration or a commanded EGR concentration or an exhaust gas flow through an EGR line in the engine or at least one of an exhaust valve timing and an engine load from a previous proximate cycle of the engine.

In a further embodiment, the main fuel injection precedes the pilot fuel injection. In a further embodiment, the exhaust gas concentration is greater than 30%, or between 30% and 50%.

In a further embodiment, the method is practiced where the gaseous fuel comprises at least one of natural gas, methane, propane, liquid petroleum gas, hydrogen, and ethane.

In an embodiment, the method is practiced where the gaseous fuel is a blend comprising at least two of methane, propane and hydrogen.

In an embodiment, a gaseous-fuelled direct injection internal combustion engine capable of using EGR comprises a controller, a combustion chamber defined by a piston, and an intake line for introducing an intake charge into the combustion chamber. Also included is a main fuel injector for delivering a gaseous fuel to the combustion chamber at a gaseous fuel timing, the gaseous fuel timing being when the piston is at near top dead center near completion of a compression stroke of the engine. Also included is a pilot fuel injector for delivering an auto-ignitable pilot fuel to the combustion chamber at a pilot fuel timing, the pilot fuel injector capable of adjusting the pilot fuel timing and the pilot fuel timing being when the piston is at near top dead center near completion of a compression stroke of the engine. The engine comprises at least one sensor for monitoring a signal indicative of EGR concentration in the intake charge during a cycle of the engine. The sensor or sensors are in communication with the controller and the controller is in communication with the pilot fuel injector. The controller is therefore, capable of adjusting the pilot fuel timing in response to the signal.

Further aspects of the invention and features of specific embodiments of the invention are described below.

BRIEF DESCRIPTION OF THE DRAWINGS

In drawings which illustrate non-limiting embodiments of the invention:

FIG. 1a-1e illustrates five cross-sectional views of the combustion chamber of a four-stroke gaseous-fuelled direct injection internal combustion engine. FIG. 1a shows an intake stroke of a cycle of the engine. FIG. 1b shows a compression stroke of a cycle of the engine. FIG. 1c shows fuel being directly injected into the combustion chamber at the completion of the combustion event. FIG. 1d shows a power stroke of a cycle of the engine. FIG. 1e shows an exhaust stroke of a cycle of the engine.

Figure 2:
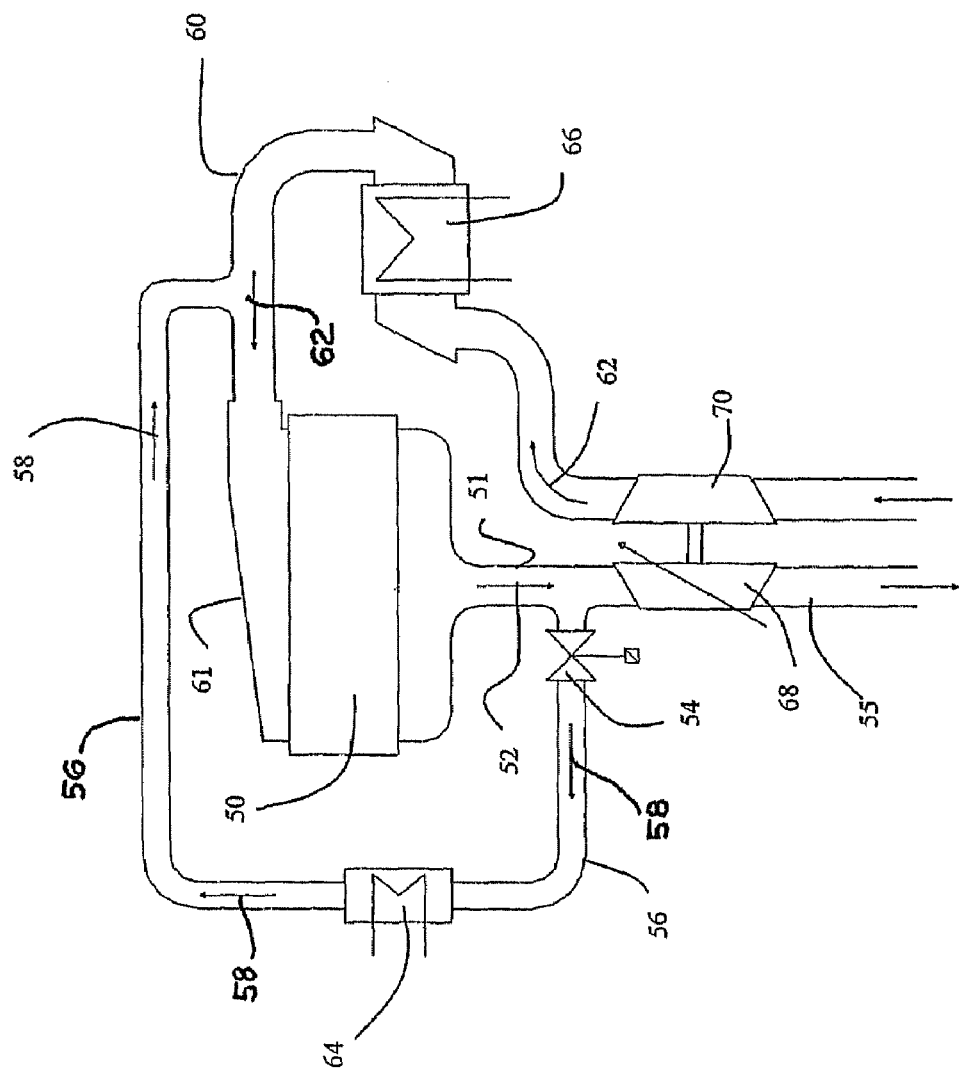
FIG. 2 is a schematic diagram of an exhaust gas recirculation system for a gaseous-fuelled direct injection internal combustion engine.

DETAILED DESCRIPTION OF PREFERRED
EMBODIMENT(S)

The present method and apparatus secure high EGR levels in a gaseous-fuelled direct injection engine by adjusting pilot timing in response to target EGR levels.

Referring to FIG. 1, a cross-section providing the stages in a cycle of a typical gaseous-fuelled direct injection engine is shown. FIG. 1a provides an intake charge introduced into combustion chamber 10 through intake line 14 in direction 12. The intake charge can include any combination of fresh air, EGR, water and gaseous fuel. At the same time, piston 16 is, during the intake stroke, moving in direction 17 away from injector 18, which is disposed in a fire deck and in fluid communication with combustion chamber 10. Also shown is exhaust line 20. FIG. 1b demonstrates piston 16 moving in direction 22 compressing the charge within the combustion chamber during the compression stroke of the engine. Referring to FIG. 1c, pilot fuel 24 can be introduced into combustion chamber 10 when the piston is at or near top dead center. For the purposes of this application, injection of pilot fuel near or at top dead center is generally within 30 crank angle degrees on either side of top dead center. In general, a main gaseous fuel injection (not shown) is provided to the combustion chamber shortly after pilot fuel 24 is introduced. Referring to FIG. 1d, the pilot and gaseous fuel burn when the piston is near top dead center, as indicated by combustion products 26, thereby driving piston 16 in direction 25. The gaseous fuel is ignited by the pilot fuel 24 after ignition of pilot fuel 24.

For the purposes of this disclosure, as pilot fuel 24 is directly injected into the combustion chamber near top dead center of the compression stroke it tends to burn in a diffusion combustion mode.

Finally, the cycle of the engine is completed with the exhaust stroke wherein combustion products 26 are driven from the combustion chamber into exhaust line 20 in direction 30 by action of piston 16 moving in direction 28.

Referring to FIG. 2, a typical EGR system is shown in which engine block 50 housing one or more combustion chambers expels exhaust gas in direction 52 through line 51 and ultimately line 55. Some exhaust gas is then directed through valve 54 into line 56 in direction 58 where it is mixed in line 61 with intake air directed through line 60 in direction 62. Line 61 directs the intake air/EGR charge to engine block 50. Coolers 64 and 66 can be used in both lines 56 and 60 to cool and increase the density of both the intake air and EGR fraction. Also, variable speed turbine 68 and turbocharger 70 can be incorporated.

Figure 3:
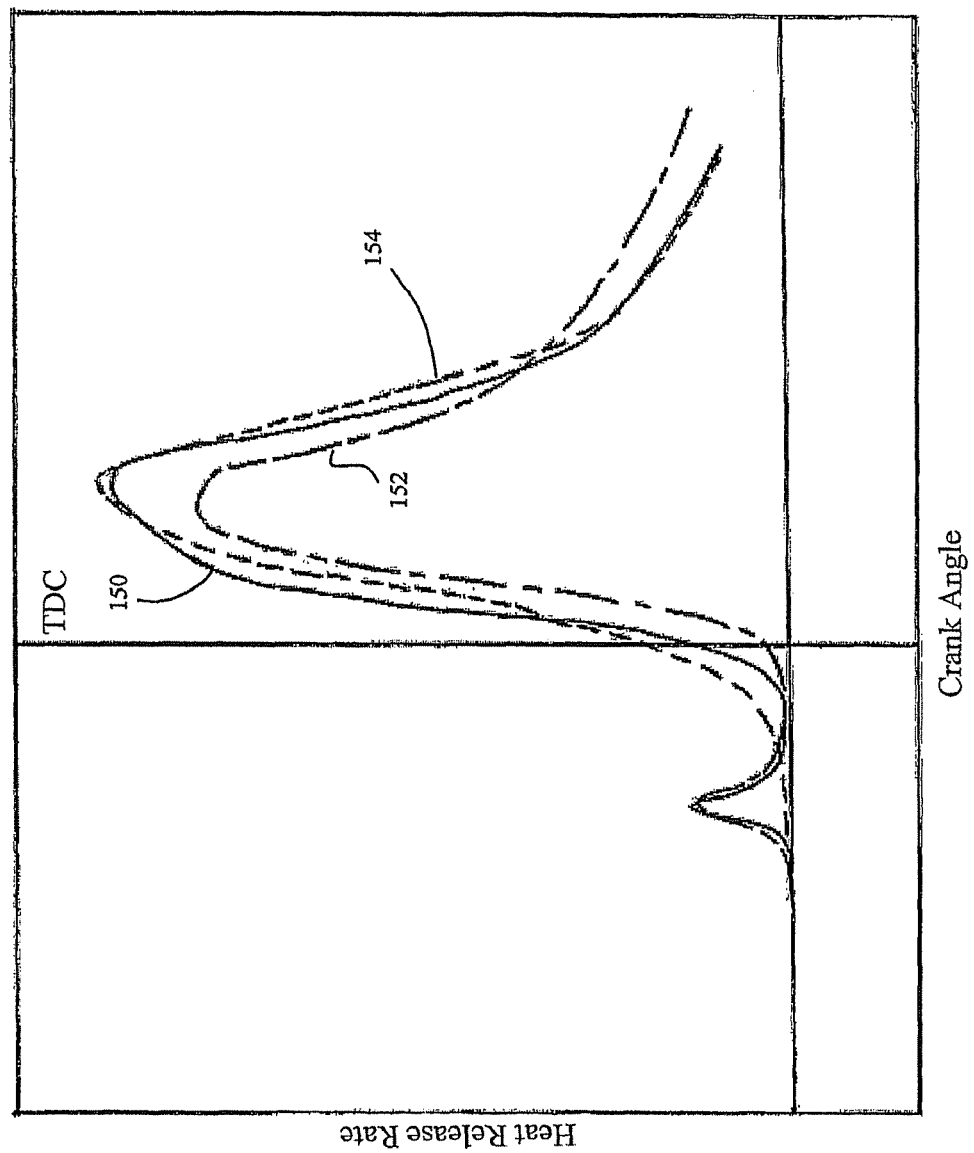
FIG. 3 is a graph of heat release rate plotted against crank angle, and demonstrating the effect of pilot fuel timing on changes in the EGR level for a gaseous-fuelled direct injection engine.

Referring to FIG. 3, an example is provided to illustrate the influence of pilot fuel timing on heat release rate (HRR). Here, HRR is plotted against crank angle for a cycle of a gaseous-fuelled direct injection internal combustion engine. Curve 150 provides a nominal HRR for an intake charge that includes no EGR. With the same pilot injection timing, HRR curve 152 shows the effect of variation in EGR levels on the HRR. HRR curve 154 shows HRR representative of a cycle with the EGR concentration of 50% (50% of the intake charge is exhaust gas) where an initial pilot fuel timing, $t(P)_{in}$ is adjusted by a pilot fuel timing adjustment, $t(P)_{adj}$.

Figure 4:
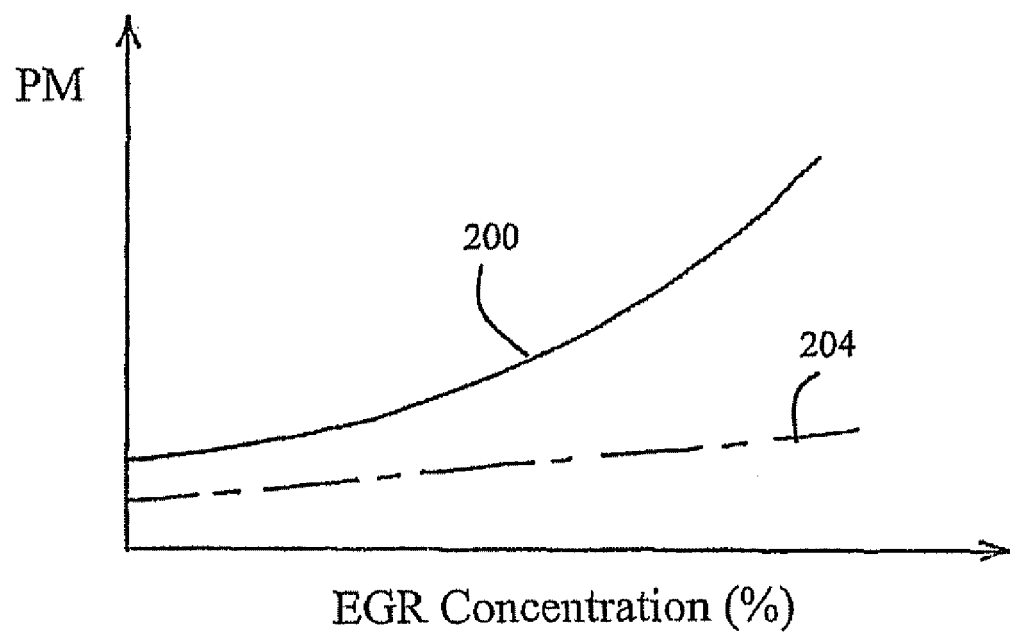
FIG. 4 is a graph of PM and CO concentration plotted against EGR concentration, and showing the emissions improvements when pilot timing is changed as between the two lines plotted in each case, one line showing higher EGR concentrations with no adjustment of pilot timing and one line showing pilot timing adjustment with the same high EGR concentrations.
Figure 4:
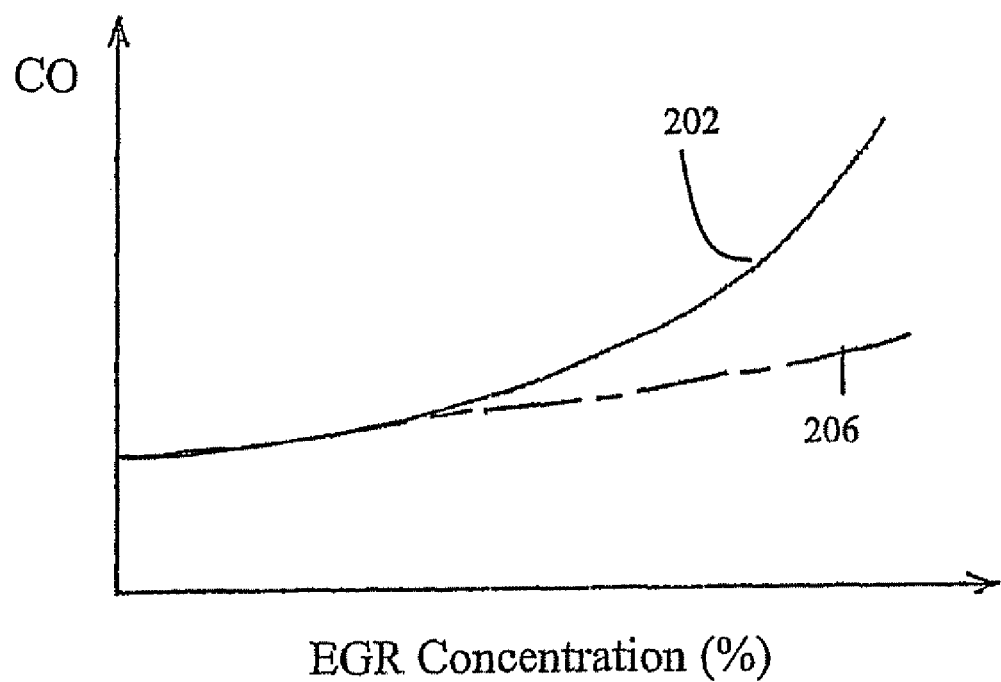

Referring to FIG. 4, PM and CO are both plotted against increasing EGR levels. Curve 200 and curve 202 both represent PM and CO emissions, respectively, where there is no adjustment of pilot fuel timing. Curve 204 and curve 206 show an adjustment of pilot fuel timing over line 200 and 202, respectively, providing the resulting emissions levels.

The pilot fuel injection timing can be expressed either in terms of the crank angle degrees relative to a fix crank angle during an engine cycle (usually top dead center) or as relative to the gaseous fuel injection timing (RIT). RIT is the timing between the start of the pilot fuel injection and gaseous fuel injection. That is, an adjustment of timing of injection of pilot fuel, for a constant absolute timing of the gaseous injection, is an RIT adjustment as well as adjustment of pilot timing relative to top dead center. Given the proximate timing of main fuel injection and pilot fuel injection, reference to RIT can be more illustrative of the present technique. For the purposes of this disclosure, reference to pilot fuel timing is also a reference to RIT and vice versa. That is, a change in pilot fuel timing implies a change in RIT and a change in RIT implies a change in pilot fuel timing.

Referring to FIG. 2, an EGR system is shown. Here valve 54 and EGR cooler 64 can be used to control the EGR concentration in the intake charge provided through line 61 after mixing air introduced through line 60 with exhaust gas introduced through direction 58. In this case, the target EGR concentration, which translates to a target oxygen concentration in the intake charge, can be controlled in part by coolers 64 and 66 and valve 54.

Note, the measured oxygen concentration of the intake charge can be used to then adjust pilot fuel timing based on a calibrated correlation between the determined EGR rate and a target pilot timing as discussed below.

When an EGR system is used, there can be variations in intake charge properties during a transient event, or from cylinder-to-cylinder. The influence of these variations can be taken into account using the present technique and closed loop control on the intake charge properties as discussed below.

In reference to FIG. 3, the present technique is demonstrated where the RIT is held constant for curve 152 while the intake charge properties are changed to include an elevated level of EGR over that resulting in curve 150.

Curve 154 in FIG. 3 demonstrates the same intake charge properties as was the case for the cycle resulting in HRR curve 152, except that high levels of EGR (50% by mass) are compensated for by adjusting the RIT. RIT is reduced to manipulate HRR to resemble the original HRR curve 150. By way of example and as noted above, EGR levels of 50% of the intake charge are supported.

The strength of RIT to allow for high EGR levels provides a mechanism to influence emissions and performance. As demonstrated in FIG. 3, the EGR levels adjusted for by reducing RIT can result in HRR that approximates the HRR without EGR thereby helping to prevent any tendency to generate unwanted emissions (or unnecessary performance degradation). As would be understood by a person skilled in the art, this method considers adjustments to EGR levels to manage performance limitations and meet emissions sought for the engine in question.

Referring to FIG. 4, it can be seen that the changes in pilot timing lower the resulting emissions penalty often seen with high levels of EGR. That is at high levels of EGR, the CO and PM concentrations are reduced when the pilot fuel timing is retarded (the RIT is reduced). Curves 200 and 202 are both reduced to lower concentrations of each of PM and CO as represented by curves 204 and 206. By way of example, the EGR levels of 50% used to provide FIGS. 3 and 4 result in low NOx level with little penalty in PM or CO. Here, RIT was reduced to a negative number. That is, advantages were seen when the pilot fuel was introduced after start of injection of the main gaseous fuel. Such a negative RIT can be preferred with higher levels of EGR. In the example provided, RIT of approximately −0.4 ms was appropriate (for the engine speed used, approximately 1200 RPM) in relation to reducing some non-NOx emissions at high EGR levels.

Note, when pilot fuel is injected near top dead center, start of combustion (SOC) tends to be dictated by injection timing. That is, when a sufficient quantity of pilot fuel is injected near top dead center compression, the elevated temperature of the charge is typically sufficient to drive a short and predictable ignition delay (dependent on changes in that intake charge such as EGR levels) between start of pilot injection and SOC. Therefore, pilot fuel timing is generally well correlated with SOC in consideration of main fuel timing. That is, the movement of main fuel and pilot fuel timing relative to top dead center near the completion of the compression stroke, provides an effective lever over SOC. Ultimately, consideration needs to be given to SOC when setting the pilot timing relative to the main fuel timing or otherwise. It is important to control SOC to ensure desired engine performance. However, as RIT is an effective lever to control emissions where high EGR levels are sought, the relative movement of pilot fuel timing and main fuel timing is effective in controlling SOC. As such, while not entirely independent, each lever can be used to maintain the engine within a range of operational parameters for performance and emissions. Practically, therefore, adjustments to both RIT and combined timing of pilot fuel and main fuel are likely to occur with changes in EGR practicing the disclosed method as SOC needs to be controlled as well.

Using pilot fuel timing to allow high levels of EGR effectively adjusts the release of energy to suit the load and speed demands on the engine, to an acceptable performance range with acceptable emissions. It is felt as EGR levels increase, the burn rate of the main fuel can slow. Therefore, reduced RIT and negative RIT help to speed combustion by allowing the main fuel to populate the combustion chamber nearer or after start of combustion of the pilot fuel thereby allowing for some premixed combustion (rather than diffusion combustion) of the main fuel.

In practice, the engine would tend to operate from a calibrated map that would correlate a target EGR level to an RIT (or an RIT adjustment over a previous timing when transitioning into a higher EGR concentration, both of which are considered a pilot timing in any event). The selected RIT would be calibrated to provide an acceptable emissions profile (that is, an acceptable concentrations of NOx, HC, CO and PM, in general). This method requires some control over the EGR system. Referring to FIG. 2, valve 54 and EGR cooler 64 can be used to control the EGR concentration in the intake charge provided through line 61 after mixing air introduced through line 60 with exhaust gas introduced through direction 58. In this case, the target EGR concentration, which translates to a target oxygen concentration in the intake charge, can be controlled in part by coolers 64 and 66 and valve 54.

Alternatively, closed loop control could be incorporated wherein oxygen levels of the intake charge or $CO_2$ concentration of EGR both (indicative of EGR concentration) could be monitored along with emissions levels wherein pilot fuel timing and EGR levels would be adjusted to provide an acceptable emissions profile balancing the desire for low NOx emissions with an acceptable penalty regarding HC, CO and PM emissions. These values would provide an RIT for a given speed and load in light of the monitored oxygen concentration, $CO_2$ concentration or other measurement indicative of EGR concentration.

Closed loop control can also be effective controlling injectors between various cylinders where EGR concentrations can vary. Oxygen concentration (or a value indicative of oxygen concentration) within the intake charge for each cylinder could be monitored. Variations from cylinder to cylinder could be adjusted for by correlating the measured oxygen concentration (or indicative value corresponding to oxygen concentration) with an RIT value suitable for the EGR concentration found (oxygen concentration found).

Also, closed loop control can include measuring and adjusting pilot fuel timing based on a targeted intake charge composition where that property is relatively easily controlled and predicted, such as typically is the case for an engine employing an EGR strategy.

Also, a combination of open and closed loop control can be used, as would be understood by a person skilled in the art.

For the purposes of this application, references to EGR concentrations are references to concentration by mass. That is, an intake charge concentration of 30% EGR indicates that 30% of the mass of the ingested charge is the recirculated exhaust gas.

As discussed above, EGR can be created by routing exhaust gas from the exhaust line through to the intake line as shown in FIG. 2. However, "internal EGR" can be used wherein the exhaust valve is closed early to provide for an increased quantity of residual exhaust gases in the combustion chamber at the commencement of the intake stroke.

Here closed loop control to sensor providing a measure of oxygen concentration in the intake charge cannot be used, but other closed loop techniques could be considered that provided value indicative of EGR concentration, so that this value could be correlated to a (a likely mapped) pilot fuel RIT value (in consideration of speed and load in the engine, by way of example).

Note the timings referred to are commanded timings, as would be understood by a person skilled in the art.

Typical pilot fuels include diesel fuel and other high cetane number fuels that more readily auto-ignite under the conditions provided for in combustion chamber 10.

Gaseous fuels include natural gas, methane, hydrogen, ethane, propane, propane blends such as liquid petroleum gas, blends of gaseous fuels such as blends of natural gas and hydrogen.

Changes in RIT includes reference to pilot timing changes that include RIT changes.

While the above embodiments are discussed in the context of a four-stroke engine, the embodiment can be adapted to two-stroke engines or rotary engines. Any reference to intake stroke, compression stroke, power stroke and exhaust stroke, encompasses a rotary engine (intake event, compression event, power event and exhaust event) and four-stroke engines.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of operating a gaseous-fuelled direct injection internal combustion engine defining a combustion chamber, said method comprising:
   (a) determining an engine speed and engine load for said engine for a cycle of said engine;
   (b) during said cycle of said engine:
      (i) directing an intake charge into said combustion chamber, said intake charge having an exhaust gas recirculation (EGR) concentration,
      (ii) compressing said intake charge within said combustion chamber during a compression stroke of said engine,
      (iii) directly injecting a gaseous fuel into said combustion chamber at a main fuel timing,
      (iv) directly injecting a quantity of a pilot fuel into said combustion chamber at a pilot fuel timing relative to said main fuel timing selected by reference to an indicator of said EGR concentration, said engine speed and said engine load, said pilot fuel capable of auto-igniting at a first injection crank angle when a piston is near or at top dead center within said combustion chamber, said combustion chamber partially defined by said piston,
      (v) burning said gaseous fuel and said pilot fuel, said gaseous fuel ignited as a result of combustion of said pilot fuel.

2. The method of claim 1 wherein said indicator comprises an oxygen concentration in said intake charge.

3. The method of claim 1 wherein said indicator comprises a carbon dioxide concentration in said intake charge.

4. The method of claim 1 wherein said indicator comprises a commanded EGR concentration.

5. The method of claim 1 wherein said indicator comprises an exhaust gas flow through an EGR line, said engine comprising said EGR line.

6. The method of claim 1 wherein said indicator comprises at least one of an exhaust valve timing and an engine load from a previous proximate cycle of said engine.

7. The method of claim 1 wherein said main fuel injection precedes said pilot fuel injection.

8. The method of claim 7 wherein said fuel injection is when said piston is at or near top dead center near completion of a compression stroke of said engine.

9. The method of claim 1 wherein said exhaust gas concentration is greater than 30%.

10. The method of claim 9 wherein said engine is operating at any point on an engine map of said engine.

11. The method of claim 1 wherein said exhaust gas concentration is between 30% and 50%.

12. The method of claim 1 wherein said gaseous fuel comprises at least one of:
    (a) natural gas,
    (b) methane,
    (c) propane,
    (d) liquid petroleum gas,
    (e) hydrogen,
    (f) ethane, and
    (g) blends of natural gas and hydrogen.

13. The method of claim 1 wherein said gaseous fuel is a blend comprising at least two of methane, propane and hydrogen.

14. A gaseous-fuelled direct injection internal combustion engine capable of using exhaust gas recirculation (EGR), said engine comprising:
    (a) a controller,
    (b) a combustion chamber defined by a piston,
    (c) an intake line for introducing an intake charge into said combustion chamber,
    (d) a main fuel injector for delivering a gaseous fuel to said combustion chamber at a gaseous fuel timing, said gaseous fuel timing being when said piston is at or near top dead center near completion of a compression stroke of said engine,
    (e) a pilot fuel injector for delivering an auto-ignitable pilot fuel to said combustion chamber at a pilot fuel timing, said pilot fuel injector adjusting said pilot fuel timing and said pilot fuel timing being when said piston is at or near top dead center near completion of said compression stroke of said engine,
    (f) at least one sensor for monitoring a signal indicative of EGR concentration in said intake charge during a cycle of said engine, said at least one sensor in communication with said controller, said controller in communication with said pilot fuel injector and adjusting said pilot fuel timing relative to said gaseous fuel timing in response to said signal.

* * * * *